United States Patent
Aoki et al.

(10) Patent No.: US 8,608,012 B2
(45) Date of Patent: Dec. 17, 2013

(54) AUTOMOTIVE FUEL TANK

(75) Inventors: Tomohide Aoki, Aichi-ken (JP); Tomohisa Imaeda, Aichi-ken (JP)

(73) Assignee: FTS Co., Ltd., Aichi (JP)

( * ) Notice: Subject to any disclaimer, the term of this patent is extended or adjusted under 35 U.S.C. 154(b) by 427 days.

(21) Appl. No.: 12/292,708

(22) Filed: Nov. 25, 2008

(65) Prior Publication Data

US 2009/0139994 A1 Jun. 4, 2009

(30) Foreign Application Priority Data

Nov. 30, 2007 (JP) .................. 2007-310482

(51) Int. Cl.
*B65D 1/42* (2006.01)
*B65D 6/34* (2006.01)
*B65D 8/08* (2006.01)

(52) U.S. Cl.
USPC ........... 220/563; 220/562; 220/651; 411/257; 411/171

(58) Field of Classification Search
USPC .................... 220/562, 651, 652, 653, 563; 264/171.27; 411/257, 171
See application file for complete search history.

(56) References Cited

U.S. PATENT DOCUMENTS

| | | | | |
|---|---|---|---|---|
| 3,458,380 A | * | 7/1969 | Kipp | 156/309.6 |
| 3,705,931 A | * | 12/1972 | Confer | 264/515 |
| 4,589,563 A | * | 5/1986 | Born | 220/581 |
| 5,326,514 A | | 7/1994 | Linden et al. | |
| 5,445,783 A | | 8/1995 | Irish et al. | |
| 5,819,978 A | * | 10/1998 | Hlebovy | 220/601 |
| 6,135,306 A | * | 10/2000 | Clayton et al. | 220/564 |
| 6,138,859 A | * | 10/2000 | Aulph et al. | 220/563 |
| 6,338,420 B1 | * | 1/2002 | Pachciarz et al. | 220/562 |
| 6,737,132 B1 | * | 5/2004 | Michihata et al. | 428/35.7 |
| 7,810,670 B2 | * | 10/2010 | Carter et al. | 220/565 |
| 2007/0254172 A1 | | 11/2007 | Kanazawa et al. | |

FOREIGN PATENT DOCUMENTS

| | | |
|---|---|---|
| JP | A-01-301227 | 12/1989 |
| JP | A-06-143396 | 5/1994 |
| JP | A-H06-143396 | 5/1994 |
| JP | A-2000-334818 | 12/2000 |
| JP | A-2006-182013 | 7/2006 |

OTHER PUBLICATIONS

Office Action dated Feb. 15, 2012 in corresponding JP Application No. 2007-310482 (and English translation).
Office Action dated Oct. 1, 2012 in corresponding JP Application No. 2007-310482 (and English translation).

* cited by examiner

*Primary Examiner* — J. Gregory Pickett
*Assistant Examiner* — Blaine Neway
(74) *Attorney, Agent, or Firm* — Posz Law Group, PLC (57) ABSTRACT

An automotive fuel tank is provided in which a plurality of mounting members are provided on a built-in part which are fusion bonded to an inner surface of an outer wall of the fuel tank so as to attach the built-in part in place in the fuel tank. An abutment portion is formed on the mounting member which is brought into abutment with an inner surface of the outer wall of the fuel tank. The abutment portion has formed thereon an abutment surface which is made to tightly stick to the inner surface of the outer wall of the fuel tank and elongated projections which project from the abutment surface, whose cross section at their distal end portions is of triangular shape and which penetrate into an interior of the outer wall of the fuel tank, and a height of an apex of the elongated projection from the abutment surface is in the range of 30% to 70% of a thickness of the outer wall of the fuel tank.

20 Claims, 8 Drawing Sheets

AUTOMOTIVE FUEL TANK

BACKGROUND OF THE INVENTION

1. Field of the Invention

The present invention relates to a fuel tank made from a thermoplastic synthetic resin and more particularly to an automotive fuel tank whose outer wall is formed from a thermoplastic synthetic resin through blow molding and which has a built-in part in an interior thereof.

2. Related Art

Conventionally, metallic fuel tanks were used as fuel tanks for motor vehicles and the like. In recent years, however, fuel tanks made from thermoplastic synthetic resins have been in use due to thermoplastic resin materials being light in weight to satisfy increasing demands for vehicles which are light in weight, being free from rust, being easy to be molded into desired shapes.

A blow molding approach has been used in many cases in fabricating automotive fuel tanks from thermoplastic resins because the blow molding approach facilitates the molding of hollow objects. In the blow molding approach, a parison made of a molten thermoplastic synthetic resin member is extruded into a cylindrical shape from above, and air is blown into the parison while the parison is being held by molds to thereby fabricate an automotive fuel tank.

On the other hand, also in the blow molding approach, it is required to provide built-in parts such as valves and baffle plates for suppressing flowing or lapping noise of fuel in an interior of a fuel tank.

Then, to make this happen, there has been proposed an approach in which a built-in part 120 is set in a resin frame, and the resin frame is set within a mold, so that the built-in part 120 is made to be secured to an inner circumferential surface of an outer wall of a fuel tank through blow molding, whereby the built-in part 120 is mounted in an interior of the fuel tank (for example, refer to JP-A-1-301227).

In this case, however, since the built-in part 120 is set in the resin frame and is then secured to the inner circumferential surface of the outer wall of the fuel tank, labor hours have to be involved in cutting to remove the resin frame after the fuel tank has been molded, and with a small built-in part 120, a large resin frame has to be used, often resulting in a case where the weight of the molded fuel tank is increased.

Figure 15:
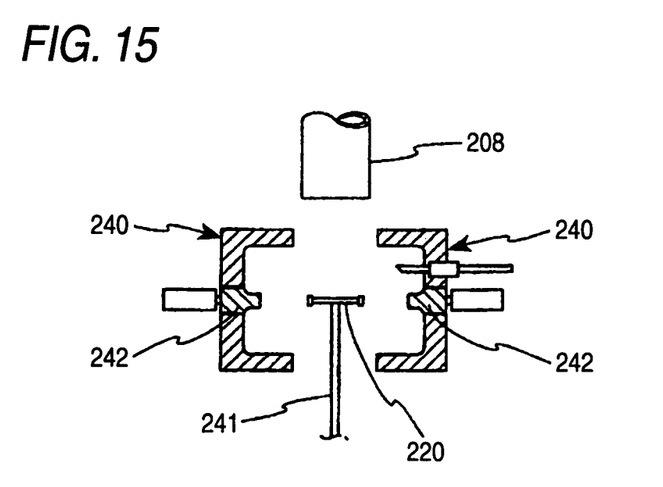
FIG. 15 is a sectional view showing a conventional fuel tank fabrication method with a blow mold in a closed state.
Figure 16:
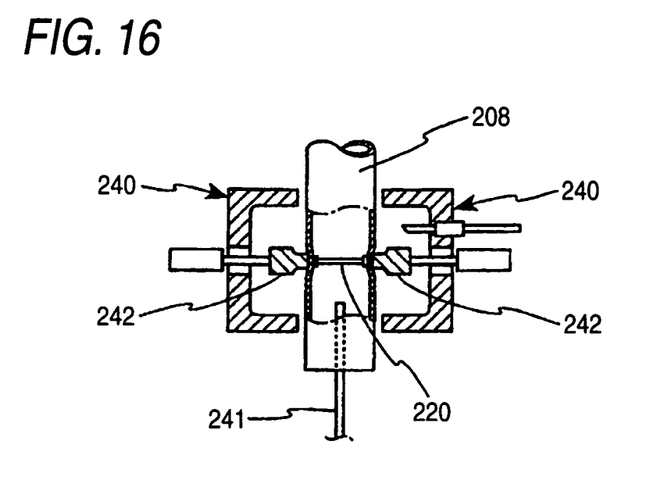
FIG. 16 is a sectional view showing the conventional fuel tank fabrication method with its press pins caused to slid inwards.

In addition, there has been proposed a fuel tank in which a built-in part is provided in an interior thereof in a way as illustrated in FIGS. 15 to 16 (for example, refer to JP-A-6-143396).

In the fuel tank, firstly, as is shown in FIG. 15, a built-in part 220 is placed on a holding rod 241 before a parison 208 is set in a blow mold 240. Thereafter, with the blow mold 24 left opened, the parison 208 is lowered, so as to position the built-in part 220 in an interior of the parison 208.

Thereafter, as shown in FIG. 16, press pins 242 are made to project inwards from both sides of the blow mold 240 before the blow mold 240 is closed to press against the parison 208, so as to press the parison 208 to side ends of the built-in part 220. As this occurs, since an inner surface of the parison 208 has not yet been set then, the parison 208 and the side ends of the built-in part 220 can be fusion bonded together.

Then, the holding rod 241 is lowered, the blow mold 240 is closed, and air is blown into the parison 208 for blow molding.

In this case, an abutment surface 233 formed at a distal end of the built-in part 220 for abutment with the parison 208 and the inner surface of the parison 208 are only brought into simple contact with each other, and the abutment surface 233 does not penetrate into an interior of the parison 208. Thus, there occurs only weak adhesion therebetween, and fusion bonding strength is not sufficiently large, leading to a fear that the abutment surface 233 may be separated from the inner surface of the parison 208 due to vibration of fuel in the fuel tank or expansion of the fuel tank.

In addition, there has been proposed a fuel tank in which upper and lower outer wall portions are recessed to contact each other for fusion bonding over several locations on the fuel tank in order to increase the strength thereof. In this case, however, since the outer wall portions are partially recessed to contact each other for fusion bonding, an interior volume of the fuel tank is reduced.

SUMMARY OF THE INVENTION

The invention has been made to cope with the situations described above, and an object thereof is to provide a fuel tank in which a built-in part can be strongly fusion bonded to an inner surface of an outer wall thereof and which has a sufficient strength.

With a view to solving the problems, according to a first aspect of the invention, there is provided an automotive fuel tank formed through blow molding and having a built-in part mounted in an interior thereof and an outer wall formed from a synthetic resin, wherein a plurality of mounting members are provided on the built-in part which are fusion bonded to the outer wall of the fuel tank so as to mount the built-in part in the interior of the fuel tank, the mounting members each having provided thereon an abutment portion which is brought into abutment with an inner surface of the outer wall of the fuel tank, the abutment portion having formed thereon an abutment surface which tightly sticks to the inner surface of the outer wall of the fuel tank and an elongated projection which projects from the abutment surface, whose cross section at a distal end portion is of triangular shape and which penetrates into an interior of the outer wall of the fuel tank, a height of an apex of the elongated projection from the abutment surface being in the range of 30% to 70% of a thickness of the outer wall of the fuel tank.

According to the first aspect of the invention, since the plurality of mounting members are provided on the built-in part which are fusion bonded to the inner surface of the outer wall of the fuel tank so as to mount the built-in part in the interior of the fuel tank, the built-in part are made to be fusion bonded to the inner surface of the outer wall of the fuel tank so as to be fixed thereto, whereby the built-in part can be mounted in the interior of the fuel tank in a stable fashion.

Since the abutment portion is formed on the mounting member which is brought into the inner surface of the outer wall of the fuel tank, the mounting member can be fusion bonded and fixed to the inner surface of the fuel tank at the abutment portion.

The abutment portion has formed thereon the abutment surface which tightly sticks to the inner surface of the outer wall of the fuel tank and the elongated projection which projects from the abutment surface, whose cross section at the distal end portion is of triangular shape and which penetrates into the interior of the outer wall of the fuel tank. Because of this, the abutment surface tightly sticks to the inner surface of the outer wall of the fuel tank, and a maximum value of a dimension by which the elongated projection penetrates into the interior of the outer wall of the fuel tank can be controlled, and the elongated projection penetrates into the interior of the outer wall of the fuel tank, so as to be strongly fusion bonded to the outer wall of the fuel tank.

Since the height of the apex of the elongated projection from the abutment surface is in the range of 30% to 70% of the thickness of the outer wall of the fuel tank, the elongated projection is allowed to penetrate sufficiently into the interior of the outer wall of the fuel tank to be brought into contact with a fused portion of the interior of the outer wall of the fuel tank, whereby the elongated projection is made easy to be fusion bonded to the outer wall of the fuel tank at the apex portion thereof, so as to be strongly fusion bonded to the outer wall of the fuel tank. Furthermore, since the height of the elongated projection is 30% to 70% of the thickness of the outer wall of the fuel tank, there is caused no such situation that the elongated projection penetrates too deep into the interior of the outer wall to thereby reduce the strength of the outer wall of the fuel tank.

According to a second aspect of the invention, there is provided an automotive fuel tank as set forth in the first aspect of the invention, wherein a plurality of elongated projections like the elongated projection are formed on the abutment surface in an arc-like fashion at intervals of 1 mm to 3 mm, and a plurality of air release grooves are formed in a radial direction in such a manner as to traverse the elongated projections.

According to the second aspect of the invention, since the plurality of elongated projections are formed on the abutment surface in the arc-like fashion, the abutment surface is prevented from getting out of position in every direction thereof, the abutment surface can strongly be fusion bonded to the outer wall of the fuel tank over a wide area of the abutment surface.

Since the elongated projections are provided at intervals of 1 mm to 3 mm, the outer wall of the fuel tank can penetrate between the projections, whereby the outer wall of the fuel tank and the abutment surface can strongly be fixed to each other.

Since the plurality of air release grooves are formed in the radial direction in such a manner as to traverse the elongated projections, when the abutment surface is pressed against the outer wall of the fuel tank, air trapped between the elongated projections and the outer wall of the fuel tank can be discharged therefrom, whereby the outer wall of the fuel tank and the abutment surface can be made to tightly stick to each other.

According to a third aspect of the invention, there is provided an automotive fuel tank as set forth in the first aspect of the invention, wherein a plurality of elongated projections like the elongated projection are formed on the abutment surface in a radial direction at intervals, the intervals between the elongated projections so formed being in the range of 1 mm to 3 mm.

According to the third aspect of the invention, since the plurality of elongated projections like the elongated projection are formed on the abutment surface in the radial direction at intervals, the intervals between the elongated projections so formed being in the range of 1 mm to 3 mm, when the abutment surface is pressed against the outer wall of the fuel tank, air trapped between the elongated projections and the outer wall of the fuel tank can be discharged in the radial direction, whereby the mounting member can be prevented from being offset in a rotational direction or a horizontal direction by the abutment surface. In addition, as with the second aspect of the invention, since the intervals between the elongated projections are in the range of 1 mm to 3 mm, the outer wall of the fuel tank can penetrate between the projections, whereby the outer wall of the fuel tank and the abutment surface can strongly be fixed to each other.

According to a fourth aspect of the invention, there is provided an automotive fuel tank as set in any of the first to fourth aspect of the invention, wherein a projecting portion is formed in such a manner as to project from the abutment surface in a step-like fashion, the elongated projections being formed from a surface of the projecting portion, a height of an apex of the elongated projection from the abutment surface being in the range of 30% to 70% of a thickness of the outer wall of the fuel tank.

According to the fourth aspect of the invention, since the projecting portion is formed in such a manner as to project from the abutment surface in the step-like fashion and the elongated projection is formed from the surface of the projecting portion, the angle of the elongated projection at the distal end can be made large, and when the outer wall of the fuel tank and the elongated projection are fusion bonded to each other, the elongated projection is made easy to adapt itself to the outer wall, whereby the elongated projection can strongly be fusion bonded to the outer wall. The projecting portion is also allowed to penetrate into the interior of the outer wall, whereby the elongated projection can be fusion bonded to the outer wall of the fuel tank in an ensured fashion.

According to a fifth aspect of the invention, there is provided an automotive fuel tank as set forth in any of the first to fourth aspect of the invention, wherein the mounting member is formed separately from the built-in part and is thereafter brought into engagement with the built-in part.

According to the fifth aspect of the invention, since the mounting member is formed separately from the built-in part and is thereafter brought into engagement with the built-in part, the molding of the mounting member is facilitated, and the shape of the abutment surface of the mounting member can be formed freely. In addition, the selection of a material for the mounting member is facilitated, it becomes possible to select materials which have resistance to fuel oil and which are easy to be fusion bonded to the outer wall of the fuel tank.

According to a sixth aspect of the invention, there is provided an automotive fuel tank as set forth in any of the first to fifth aspects of the invention, wherein the outer wall of the fuel tank is formed by five layers including an exterior main layer, an exterior adhesive layer, a barrier layer, an interior adhesive layer and an interior main layer which are arranged in that order from an outside of the outer wall, the exterior main layer and the interior main layer being formed from a high-density polyethylene (HDPE), the barrier layer being formed from an ethylene-vinyl alcohol copolymer (EVOH), the exterior adhesive layer and the interior adhesive layer being formed from a synthetic resin having adhesion to both the high-density polyethylene (HDPE) and the barrier layer.

According to the sixth aspect of the invention, since the exterior main layer and the interior main layer are formed from the high-density polyethylene (HDPE), an external side of the fuel tank has sufficient rigidity and impact resistance, and even though fuel penetrates into the interior main layer, the rigidity of the fuel tank can be ensured and the impact resistance can be increased.

Since the barrier layer is formed from the ethylene-vinyl alcohol copolymer (EVOH), the barrier layer has superior gasoline impermeability, and the barrier layer can be fusion molded and hence has superior processing property. In addition, the barrier layer has also superior impermeability against gasoline containing alcohol even under a highly humid condition.

Since the exterior adhesive layer and the interior adhesive layer are formed from the synthetic resin having adhesion to both the high-density polyethylene (HDPE) and the barrier layer, the exterior adhesive layer and the interior adhesive layer allow the barrier layer to be strongly bonded to both the exterior main layer and the interior main layer, so that the respective layers of the fuel tank are allowed to strongly be bonded together, whereby the layers of the fuel tank can be integrated together to ensure the fuel impermeability and strength of the fuel tank.

According to a seventh aspect of the invention, there is provided an automotive fuel tank as set forth in any of the first to sixth aspects of the invention, wherein the built-in part has formed thereon a baffle plate or a valve for suppressing flowing noise of a fuel.

According to the seventh aspect of the invention, since the built-in part has formed thereon the baffle plate or the valve for suppressing flowing noise of fuel, the baffle plate or valve can be mounted at the same time as the fuel tank is blow molded, whereby the fuel tank can easily be fabricated which can discharge fuel, prevent the discharge of evaporative fuel and suppress the flowing noise of fuel.

The mounting member for mounting the built-in part in the fuel tank has the abutment portion, and the abutment portion has formed thereon the abutment surface and the elongated projections. Because of this, the abutment surface is allowed to tightly stick to the inner surface of the outer wall of the fuel tank, so that the maximum value of the dimension by which the elongated projections penetrate into the interior of the outer wall of the fuel tank can be controlled, and the elongated projections penetrate into the interior of the outer wall of the fuel tank so as to be strongly fusion bonded to the outer wall of the fuel tank.

The height of the apex of the elongated projection from the abutment surface is in the range of 30% to 70% of the thickness of the outer wall of the fuel tank, and therefore, the elongated projection can sufficiently penetrate into the interior of the outer wall of the fuel tank. Thus, the elongated projection can be brought into contact with the fused portion in the interior of the outer wall of the fuel tank, and the apex portion of the elongated projection is made easy to be fusion bonded to the outer wall of the fuel tank, whereby the mounting member can be fusion bonded to the outer wall of the fuel tank.

According to an eighth aspect of the invention, the elongated projections are formed on the abutment surface in a radial direction at intervals such that air release grooves are formed between the elongated projections.

According to the eighth aspect of the invention, when the abutment surface is pressed against the outer wall of the fuel tank, air trapped between the elongated projections and the outer wall of the fuel tank are discharged in the radial direction along the air release grooves. Therefore, the mounting member can be prevented from being out of position in a rotational direction or horizontal direction.

According to the ninth aspect of the invention, a plurality of projecting portions which project from the abutment surface are formed such that the elongated projections are formed therein, and adjacent ones of the projecting portions are formed apart from each other at a predetermined distance such that a bottom face is formed therebetween.

According to the ninth aspect of the invention, the bottom face is formed between the projecting portions. Therefore, the distance between the apexes of the adjacent elongated projections can be increased as compared with the abutment portion in which the bottom face is not formed between the adjacent projecting portions. Consequently, when the outer wall of the fuel tank and the elongated projections are fusion bonded to each other and the apexes of the elongated projections penetrate into the interior of the outer wall, the fused outer wall is allowed to more easily enter between the elongated projections than the structure in which the bottom face is not formed between the projecting portions and the abutment portion can strongly be fusion bonded to the outer wall.

DETAILED DESCRIPTION OF THE PREFERRED EMBODIMENTS

Figure 1:
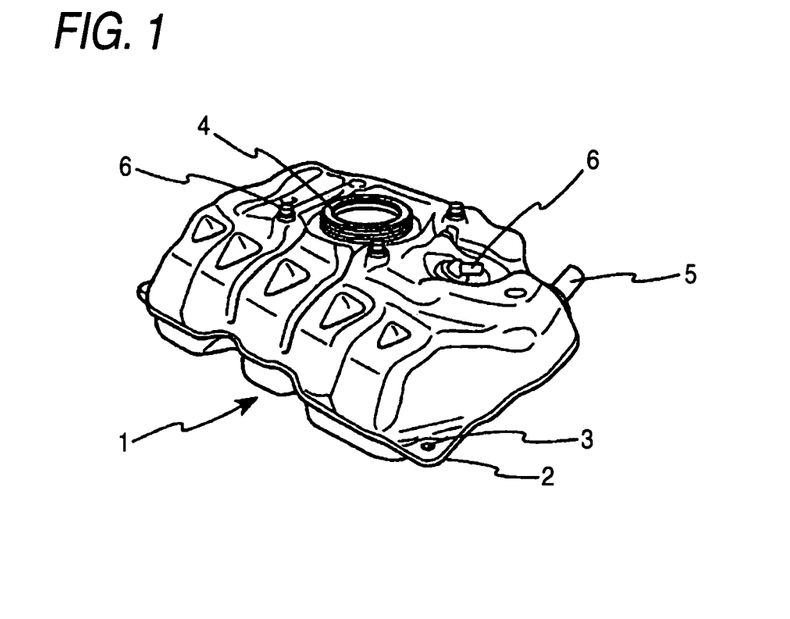
FIG. 1 is a perspective view of a fuel tank according to an embodiment of the invention.
Figure 2:
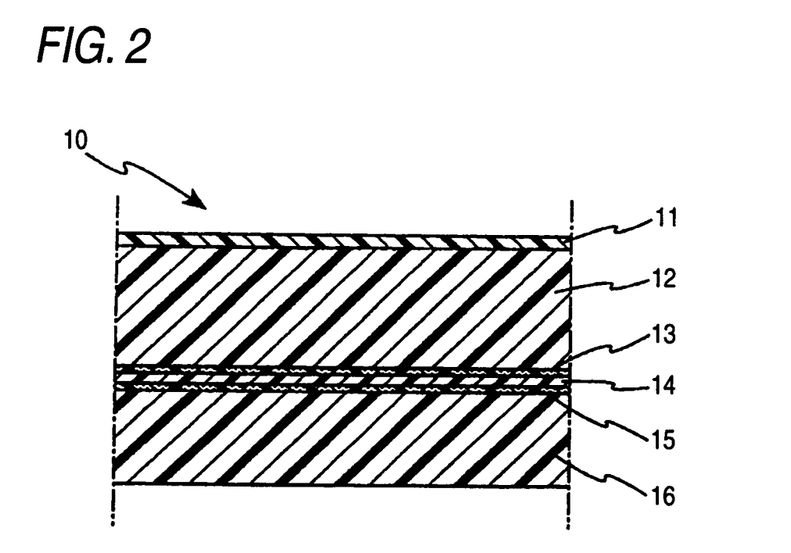
FIG. 2 is a partial enlarged sectional view showing the construction of an outer wall of the fuel tank of the invention.

An automotive fuel tank 1 of an embodiment of the invention will be described based on FIGS. 1 to 14. FIG. 1 is a perspective view of a fuel tank 1 of an embodiment of the invention, and FIG. 2 is a partial sectional view of an outer wall 10 of the fuel tank 1 which is made from a thermoplastic synthetic resin, which shows the configuration of a multi-layer construction of the outer wall 10.

Figure 3:
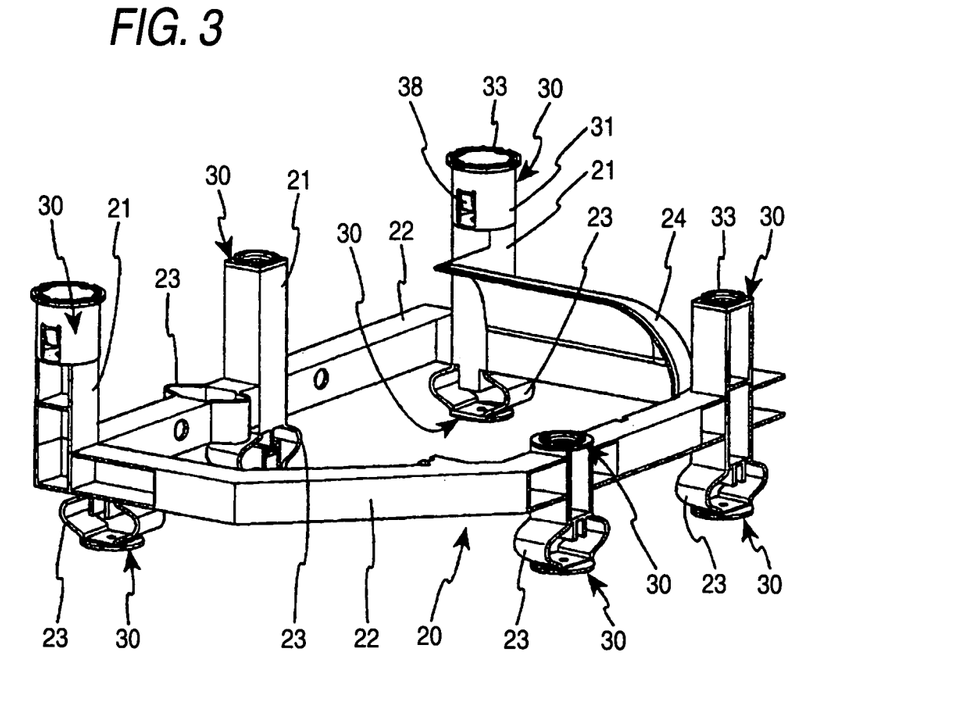
FIG. 3 is a perspective view of a built-in part which is mounted in an interior of the fuel tank of the invention.

FIG. 3 is a perspective view showing an example of a built-in part 20 of the fuel tank 1.

Figure 12:
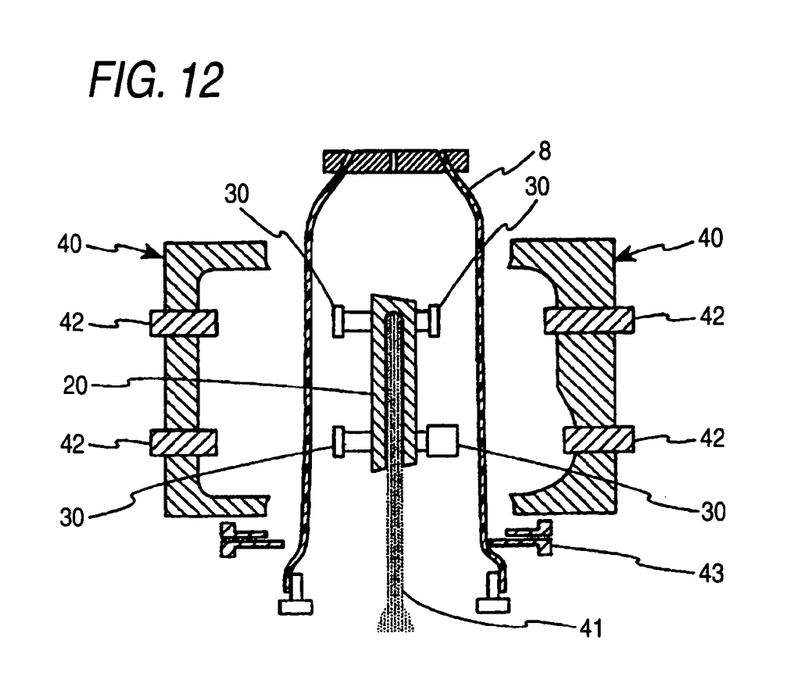
FIG. 12 is a sectional view showing a fuel tank fabrication method of the invention with a blow mold in an opened state.
Figure 13:
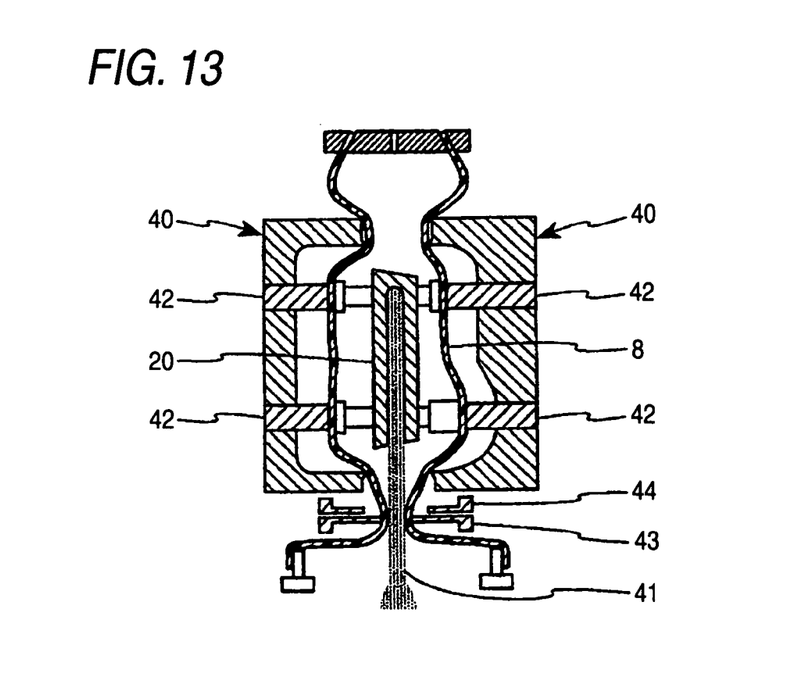
FIG. 13 is a sectional view showing the fuel tank fabrication method of the invention with its press pins caused to slid inwards.
Figure 14:
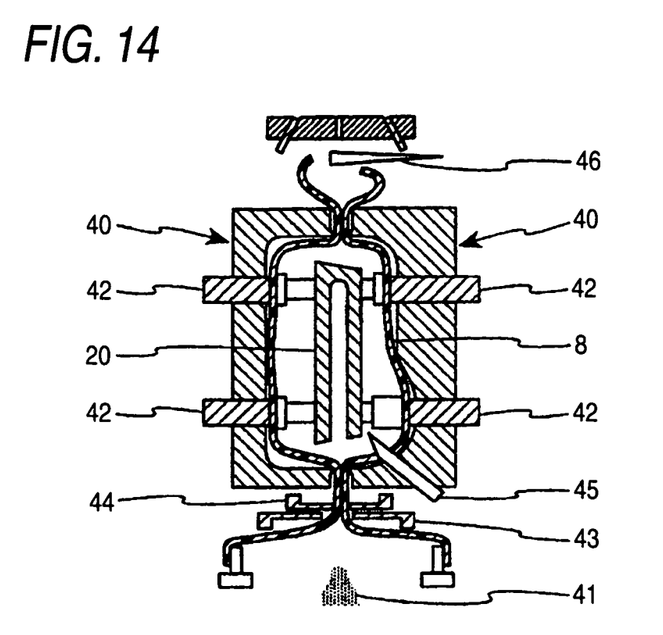
FIG. 14 is a sectional view showing the fuel tank fabrication method of the invention with the blow mold in a closed state.

FIGS. 4 to 11 are drawings showing mounting members 30 for attaching the built-in part 20 of the fuel tank 1 to an inner surface of an outer wall of the fuel tank. FIGS. 12 to 14 are drawings showing blow molding steps for fabricating the fuel tank 1.

As is shown in FIG. 1, the fuel tank 1 which is fabricated in the embodiment of the invention has a pump unit mounting hole 4 formed in an upper surface of the tank for ingress and egress of a fuel pump (not shown) into and from the fuel tank 1. In addition, a fuel inlet hole 5 into which fuel is supplied from an inlet pipe (not shown) is formed in a side surface or the upper surface of the fuel tank 1.

In addition, an outer circumferential rib 2 is formed around a full circumference of the fuel tank 1, and mounting holes 3 are formed in the outer circumferential rib 2 in several predetermined locations such as in corners thereof, whereby the mounting holes 3 and a vehicle body are fastened together with bolts so that the fuel tank 1 is mounted on the vehicle body.

Furthermore, a mounting hole 6 is formed at a portion on the upper side of the fuel tank 1 and a hose for collecting evaporated fuel in an interior of the fuel tank 1 is connected to the mounting hole 6 so formed.

In this embodiment, the fuel tank 1 is formed through blow molding, and an outer wall 10 of the fuel tank 1 is, as is shown in FIG. 2, made up of a skin layer 11, an exterior main layer 12, an exterior adhesive layer 13, a barrier layer 14, an interior adhesive layer 15 and an interior main layer 16 which are arranged in that order from an outside thereof.

In blow molding, a parison made up of the aforesaid six layers is used. A parison having a layer constitution of six or more layers can be used. In addition, as will be described later, the skin layer 11 is used when a reground material or a filler is mixed into the exterior main layer 12, but the skin layer 11 can be omitted.

The skin layer 11 and the exterior main layer 12 are formed from a thermoplastic synthetic resin which has a large impact resistance and whose rigidity is maintained against fuel oil and are preferably formed from a high-density polyethylene (HDPE). When the exterior main layer 12 contains an inorganic filler, the skin layer 11 is used to cover the surface of the exterior main layer 12, so as to eliminate such a situation that the inorganic filler so contained is exposed from the surface of the exterior main layer 12, whereby the surface of the parison 8 can be made smooth.

As a high-density polyethylene (HDPE) used for the skin layer 11, the exterior main layer 12 and the interior main layer 16, which will be described later, for example, the following polyethylenes can be used.

High-density polyethylenes (HDPE) can be used whose melt rates of flow (MRF: 21.6 kg/10 min) are in the range of 5 to 7 and densities (g/cm$^3$) are in the range of 0.944 to 0.950.

The exterior main layer 12 may be formed using as a main material a reground material which mainly contains a high-density polyethylene (HDPE). Used as reground materials which contain mainly high-density polyethylenes (HDPE) are, for example, a reground material which results by regrinding fuel tanks 1 which were salvaged after use and a reground material which results by regrinding cut pieces and defectives which are produced during the fabrication process of fuel tanks 1. Since the fuel tank 1 is made up mainly of the high-density polyethylene (HDPE), reground materials from fuel tanks 1 contain mainly the high-density polyethylene (HDPE).

These reground materials are used 100% on some occasions, while a fresh high-density polyethylene (HDPE) is mixed into the reground materials for use on other occasions.

The barrier layer 14 is formed from a thermoplastic synthetic resin which has extremely low fuel oil permeability. As thermoplastic synthetic resins used to make up the barrier layer 14, although the following can be used which include, for example, ethylene-vinyl alcohol copolymer (EVOH), polybutylene terephthalate, polyethylene terephthalate, polyphenylene sulfide (PPS) liquid crystal polymer (LCP), and semi-aromatic nylon (PPA), ethylene-vinyl alcohol copolymer (EVOH) is preferred.

Since the fuel tank 1 has the barrier layer 14, the permeation of fuel oil such as gasoline which has penetrated through the interior main layer 16, which will be described later, can be prevented by the barrier layer 14, thereby making it possible to prevent the evaporation of fuel oil into the atmosphere.

When the ethylene-vinyl alcohol copolymer (EVOH) is used as the barrier layer 14, it becomes possible to provide superior gasoline impermeability and superior processing capability through good fusion moldability of the material. In addition, the barrier layer 14 has the superior gasoline impermeability even under a high humidity condition. Furthermore, the barrier lay 14 has the superior impermeability against a gasoline containing alcohol.

The exterior adhesive layer 13 is provided between the exterior main layer 12 and the barrier layer 14, so as to bond together these two layers, and the interior adhesive layer 15 is provided between the interior main layer 16 and the barrier layer 14, so as to bond together these two layers. The exterior adhesive layer 13 and the interior adhesive layer 15 are formed from the same material and are formed from a synthetic resin which has adhesion to both the high-density polyethylene (HDPE) and the barrier layer 14. Because of this, the barrier layer 14, the exterior main layer 12 and the interior main layer 16 can be bonded strongly together by the exterior adhesive layer 13 and the interior adhesive layer 15 so that those layers can be tightly and integrally bonded together, whereby the fuel impermeability and strength of the fuel tank 1 can be ensured.

As adhesive thermoplastic synthetic resins for use for the exterior adhesive layer 13 and the interior adhesive layer 15, for example, modified polyolefin resins can be used. Unsaturated carboxylic acid modified polyolefin is preferred, and unsaturated carboxylic acid modified polyethylene is particularly preferred. This synthetic resin can be produced by copolymerization or graft polymerization of unsaturated carboxylic acid into polyolefin resin.

As has been described above with respect to the skin layer 11, the same material as that used for the skin layer 11 is used for the interior main layer 16, and hence, the interior main layer 16 is formed from the high-density polyethylene (HDPE).

The interior main layer 16 has a thickness which occupies 15% to 67% of the overall thickness of the outer wall 10 of the fuel tank 1. Since the overall thickness of the outer wall 10 is in the range of 3 mm to 8 mm, the thickness of the interior main layer 16 is in the range of 0.45 mm to 5.36 mm. By this configuration, since the interior main layer 16 has the sufficient thickness, the outer wall 10 of the fuel tank 1 can continue to hold its rigidity and ensure its impact resistance, even in the event that the outer wall 10 is swollen by fuel contained in the fuel tank 1.

For example, a built-in part 20 as shown in FIG. 3 is mounted in an interior of the fuel tank 1. A mounting method of the built-in part 20 will be described later.

Next, the built-in part 20 will be described based on FIG. 3. The built-in part 20 has a plurality of pillar members 21 which support upper and lower inner surface portions of the outer wall of the fuel tank and beam members 22 which connect the pillar members 21 to each other.

A mounting member 30 is attached to a distal end portion of the pillar member 20 which is brought into abutment with the inner surface of the outer wall of the fuel tank 1. In this embodiment, although the mounting member 30 is formed separately from the pillar member 21 and locked to a distal end of the pillar member 21, the pillar member 21 and the amounting member 30 may be formed integrally.

The mounting member 30 will be described later.

The pillar members 21 are mounted in predetermined positions in the interior of the fuel tank 1, and as will be described later, by the mounting members 30 being fusion bonded to the inner surface of the outer wall 10 of the fuel tank 1, the pillar members 21 are mounted within the fuel tank 1, so as to hold a plurality of portions of the outer wall of the fuel tank 1. Because of this, not only can the strength of the outer wall of the fuel tank 1 be increased, but also the contraction and expansion of the fuel tank can be prevented, and additionally, the strength can be maintained against impact.

In addition, as is seen from the pillar member 21 shown at a left end portion in FIG. 3, an upper mounting member 30 and a lower mounting member 30 may be provided slightly out of alignment at a portion where the beam member 22 is provided.

Furthermore, a dimension change preventive member 23 can be formed in part of the pillar member 21 to deal with contraction or expansion in the outer wall of the fuel tank 1.

The beam members 22 connect the pillar members 21 to each other, and the beam members 22 can be attached to predetermined positions on the inner surface of the outer wall of the fuel tank 1. To reduce weight and ensure rigidity, the beam members 22 can be formed to have a substantially U-shaped cross section or into a hollow shape.

In addition, as is shown in FIG. 3, a baffle plate 24 can be formed integrally on the beam member 22. As this occurs, lapping of fuel within the fuel tank 1 can be prevented to thereby suppress the flowing noise of fuel.

Additionally, in addition to baffle plates 24, valves which connect to various types of hoses and/or a sub-tank that is provided in the interior of the fuel tank 1 can be provided on the beam members 22.

Furthermore, a dimension change preventive member 23 can be formed in part of the beam member 22 to deal with contraction or expansion in the outer wall of the fuel tank 1.

The built-in part 20 can be formed from a thermoplastic synthetic resin having a fuel oil resistance such as polyacetal, high-density polyethylene (HDPE) and the like, whereby not only can the strength of the fuel tank 1 be increased, but also even in the event that the built-in part 20 is mounted in the interior of the fuel tank 1, there is caused no such situation that the rigidity thereof is reduced due to swelling by the fuel oil.

Next, the mounting members 30 will be described. As is shown in FIG. 3, the mounting members 30 are formed into a circular cylindrical shape or quadrangular cylindrical shape on some occasions and are formed into a flat shape on other occasions.

Figure 4:
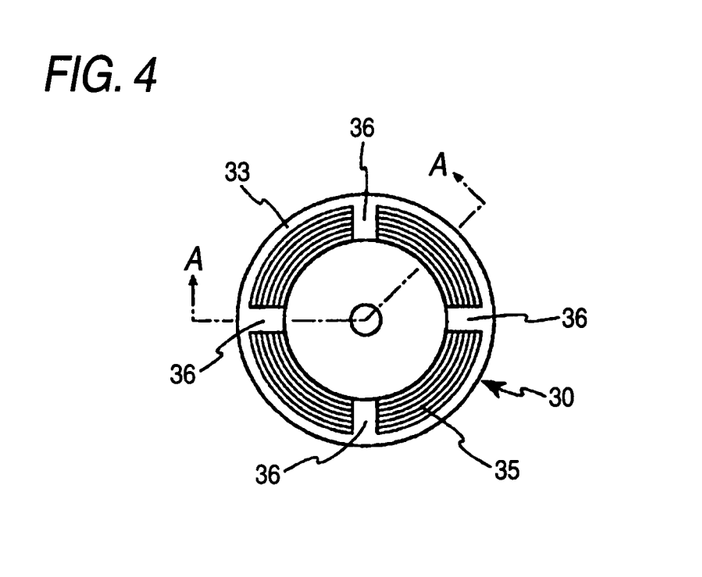
FIG. 4 is a plan view of a mounting member of the invention.
Figure 5:
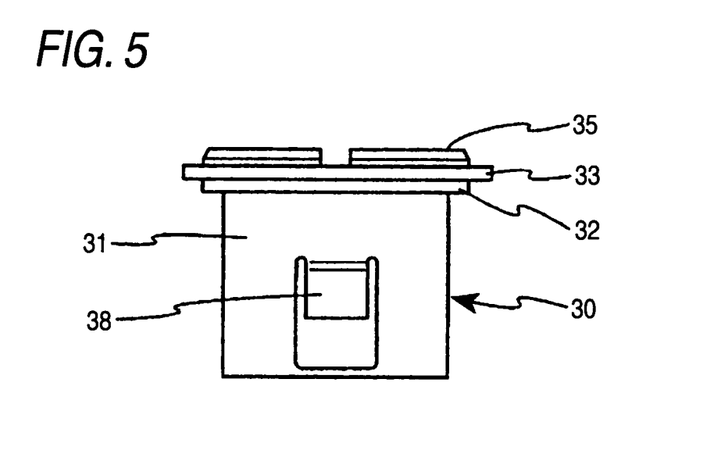
FIG. 5 is a front view of the mounting member of the invention.
Figure 6:
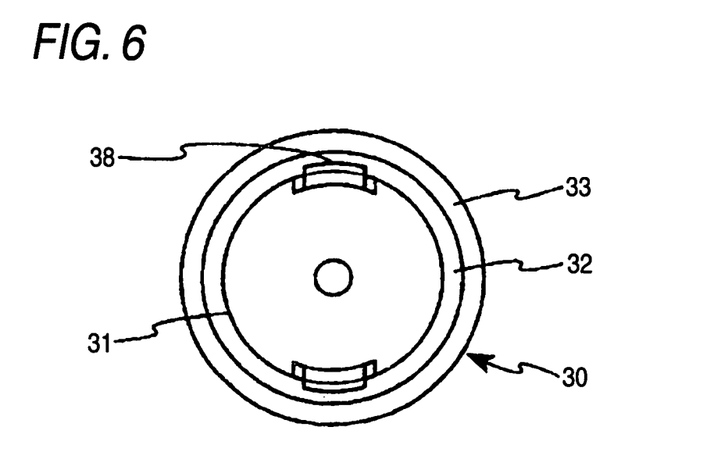
FIG. 6 is a bottom view of the mounting member of the invention.
Figure 7:
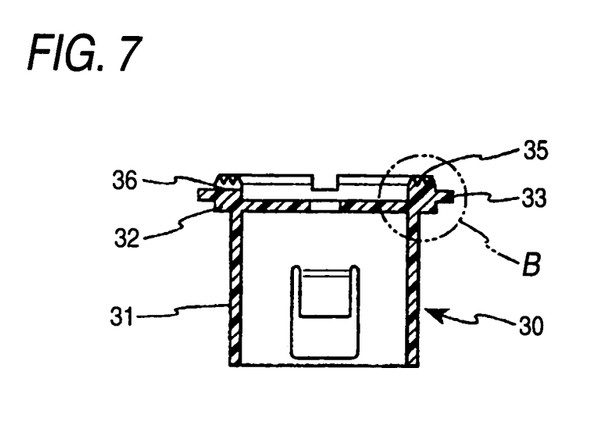
FIG. 7 is a sectional view of the mounting member of the invention, which is taken along the line A-A in FIG. 4.
Figure 8:
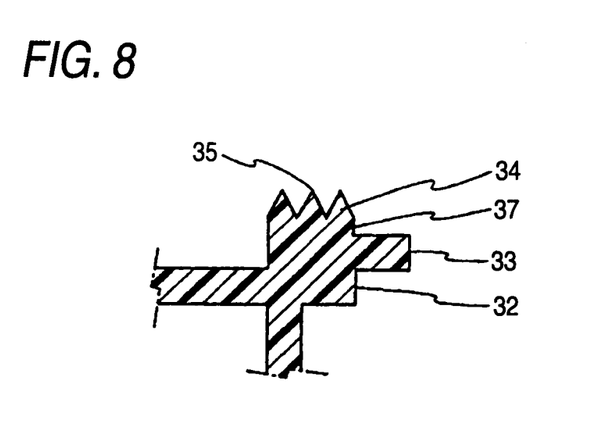
FIG. 8 is a partial enlarged sectional view of an abutment surface of the mounting member of the invention.
Figure 9:
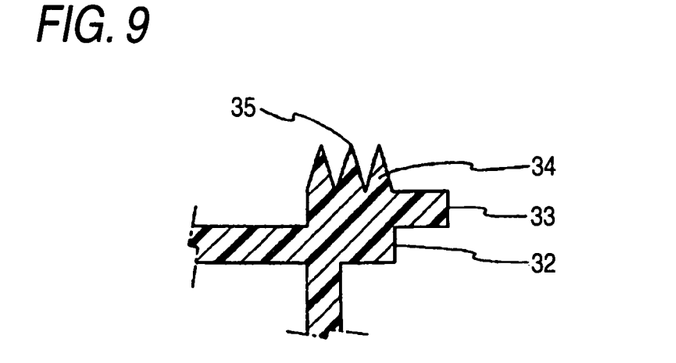
FIG. 9 is a partial enlarged sectional view of another abutment surface of the mounting member of the invention.
Figure 10:
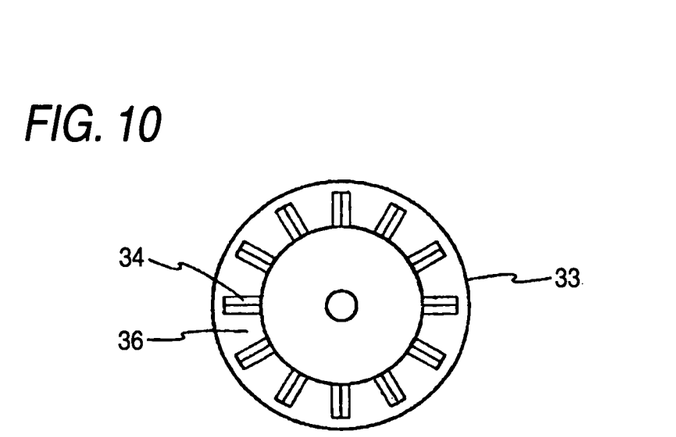
FIG. 10 is a plan view of another mounting member of the invention.

A case will be described based on FIGS. 4 to 10 where the mounting member 30 is formed into a circular cylindrical shape or quadrangular cylindrical shape. FIG. 4 is a plan view of the mounting member 30, FIG. 5 is a front view of the mounting member 30, FIG. 6 is a bottom view of the mounting member 30, FIG. 7 is a sectional view thereof taken along the line A-A shown in FIG. 4, and FIGS. 8 and 9 are enlarged sectional views of a portion denoted by reference character B in FIG. 7. FIG. 10 is a plan view of another form of a mounting member 30.

The mounting member 30 is made up of a connecting portion 31 which connects or continues to the built-in part 20 and an abutment portion 32 which is brought into abutment with the inner surface of the outer wall of the fuel tank 1.

In this embodiment, the connecting portion 31 is formed into a circular cylindrical shape and is made hollow inside. The connecting portion 31 may be formed into a quadrangular pyramid shape. A locking portion 38 is formed at a lower end of the connecting portion 31, so that a claw of the locking portion 38 is brought into engagement with a distal end of the pillar member 21 when the connecting portion 31 is fitted in the distal end of the pillar member 21, whereby the mounting member 30 is strongly attached to the pillar member 21.

With the mounting member 30 which is formed into the flat shape, no connecting portion 31 is provided, and the mounting member 30 is attached to the pillar member 21 by being locked or bonded directly on to the distal end of the pillar member 21 via a projection or a bonding surface which is provided on a lower surface of the abutment portion 32.

The abutment portion 32 has formed thereon a circular abutment surface 33 which firmly sticks to the outer wall of the fuel tank 1 and an elongated projection 34 which projects from the abutment surface 33, whose cross section at a distal end portion is of triangular shape and which penetrates into the interior of the outer wall of the fuel tank 1. In a mode shown in FIG. 4, a plurality of elongated projections 34 are formed in an arc-like fashion in parallel with each other. Because of this, the abutment surface 33 is prevented from becoming output of position in any direction thereof, and hence, the abutment surface 33 can strongly be fusion bonded to the outer wall of the fuel tank 1 in every direction.

A space of 1 mm to 3 mm is preferably provided between apexes 35 of the elongated projections 34. In the case of the elongated projections 34 being so arranged, when the abutment portion 32 is pressed against the inner surface of the outer wall of the fuel tank 1, the elongated projections 34 penetrate into the outer wall of the fuel tank 1 which is the parison 8, and the outer wall of the fuel tank 1 which is fused can enter between the elongated projections 34, whereby the outer wall of the fuel tank and the abutment surface 33 can be strongly fixed to each other.

As is shown in FIG. 4, four air release grooves 36 are formed in a radial direction in such a manner as to traverse the elongated projections 34. Because of this, when the abutment surface 33 is pressed against the outer wall of the fuel tank 1, air trapped between the elongated projections 34 and the outer wall of the fuel tank 1 can be discharged therefrom, whereby the outer wall of the fuel tank 1 and the abutment surface 33 are allowed to tightly stick to each other.

A height of the apex 35 of the elongated projection 34 from the abutment surface 33 is in the range of 30% to 70% of the thickness of the outer wall of the fuel tank 1. The thickness of the outer wall of the fuel tank 1 is of the order of 3 mm to 8 mm, and hence, the height of the apex 35 is of the order of 1.5 mm to 5 mm. Because of this, when the abutment surface 33 is pressed against the outer wall of the fuel tank 1, the elongated projections 34 can penetrate sufficiently deep into the interior of the outer wall of the fuel tank 1, so as to be brought into contact with a fused portion of the interior of the outer wall of the fuel tank 1, whereby the apex portions of the elongated projections 34 can be fusion bonded to the outer wall of the fuel tank 1. Consequently, the outer wall of the fuel tank 1 and the abutment portion 32 can strongly be fusion bonded to each other. Furthermore, since the height of the elongated projections 34 is in the order of 30% to 70% of the thickness of the outer wall of the fuel tank 1, there occurs no such situation that the elongated projections 34 bite too deep into the outer wall, and hence, the strength of the outer wall is not reduced.

When the abutment surface 33 is pressed against the outer wall of the fuel tank 1, the abutment surface 33 on which the elongated projections 34 are formed is allowed to tightly stick to the inner surface of the outer wall of the fuel tank 1. Because of this, the elongated projections 34 are not allowed to penetrate further into the inner surface of the outer wall, whereby a maximum value of a dimension by which the elongated projections 34 penetrate into the interior of the outer wall of the fuel tank 1 can be controlled.

As is shown in FIG. 8, at the abutment portion 32, firstly, a projecting portion 37 is formed in such a manner as to project from the abutment surface 33 in a step-like fashion, and then, elongated projections 34 can be formed in such a manner as to project from a surface of the projecting portion 37. As this occurs, since the height of the elongated projections 34 is reduced, the angle of the apex 35 of the elongated projection 34 can be increased. Consequently, when the outer wall of the fuel tank and the elongated projections 34 are fusion bonded to each other and the apexes 35 of the elongated projections 34 penetrate into the interior of the outer wall, the fused outer wall is allowed to easily enter between the elongated projections 34, 34, and the elongated projections 34 are made to easily adapt themselves to the outer wall and hence can strongly be fusion bonded to the outer wall.

As is shown in FIG. 9, at the abutment portion 32, firstly, elongated projections 34 can be formed in such a manner as to project directly from the abutment surface 33. As this occurs, the angle of the apex 35 of the elongated projection 34 can be made small, whereby the elongated projections 34 are allowed to easily penetrate into the outer wall which is fused. In addition, since the volume of the apex 35 of the elongated projection 34 is small and is easy to be fused, the fusion bonding between the elongated projections 34 and the outer wall of the fuel tank 1 is facilitated.

As is shown in FIG. 10, a plurality of elongated projections can be formed on the abutment surface 33 in a radial direction at intervals. Air release grooves 36 are formed between the elongated projections 34, 34 so formed. As this occurs, when the abutment surface 33 is pressed against the outer wall of the fuel tank 1, air trapped between the elongated projections 34 and the outer wall of the fuel tank 1 can be discharged in the radial direction along the air release grooves 36, whereby the mounting member 30 can be prevented from being out of position in a rotational direction or horizontal direction.

Figure 11:
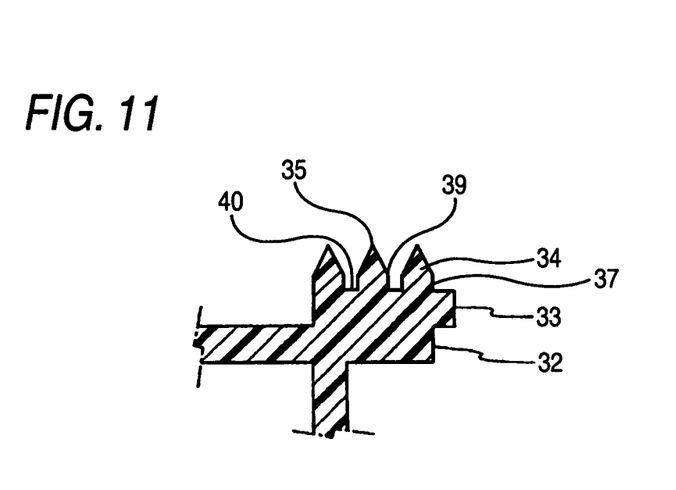
FIG. 11 is a partial enlarged sectional view of another abutment surface of the mounting member of the invention.

Further, as is shown in FIG. 11, at the abutment portion 32, adjacent projecting portions 37 can be formed in such a manner as to be apart from each other at a predetermined distance. That is, a bottom face 40 is formed in a step-like fashion between vertical walls 39 of the projecting portions 37. As this occurs, by forming the bottom face 40 between the adjacent projecting portions 37, the distance between the apexes 35 of the adjacent elongated projections 34 can be increased as compared with the abutment portion 32 shown in FIG. 8 in which no bottom face is interposed between the adjacent projecting portions 37. Consequently, when the outer wall of the fuel tank 1 and the elongated projections 34 are fusion bonded to each other and the apexes 35 of the elongated projections 34 penetrate into the interior of the outer wall, the fused outer wall is allowed to more easily enter between the elongated projections 34, 34, and the abutment portion 32 shown in FIG. 11 can also strongly be fusion bonded to the outer wall. In the embodiment of FIG. 11, the distance between the adjacent vertical walls 39 is set to be substantially identical to the height of the elongated projection 34.

Incidentally, although the projecting portion 37 is formed with the elongated projection 34 and the vertical wall 39 in FIG. 11, it is also possible to configure the abutment portion 32 by forming a bottom face 40 between the elongated projections 34 projecting directly from the abutment surface 33.

Next, a fabrication method of the fuel tank 1 through blow molding according to the invention will be described based on FIGS. 12 to 14.

Firstly, as is shown in FIG. 12, the built-in part 20 is made to be held by a holding rod 41 and is positioned in an interior of a blow mold 40 when the blow mold 40 is opened. Then, the parison 8 is lowered, so that the built-in part 20 is positioned within the interior of the parison 8.

Then, as is shown in FIG. 13, first pinching plates 43 are made to slide towards each other to hold a distal end portion of the parison 8 together with the holding rod 41 therebetween. As this occurs, a plurality of press pins 42 which are provided on the blow mold 40 are caused to slide in such a manner as to hold the parison 8 by the mounting members 30 attached to the built-in part 20 and the press pins 42.

Then, since an inner surface of the parison 8 still remains in a molten state, as has been described above, the elongated projections 34 of the abutment portions 32 of the mounting members 30 penetrate into an inner surface of the parison 8, whereby the abutment portions 32 and the parison 8 can be fusion bonded to each other. As this occurs, since the built-in part 20 is held by the holding rod 41, the mounting members 30 and the built-in part 20 can be attached to predetermined positions on the inner surface of the outer wall of the fuel tank 1 in an ensured fashion.

Thereafter, as is shown in FIG. 14, the holding rod 41 is lowered so as to be removed from the blow mold 40, and second pinching plates 44 are caused to slide to close the parison 8, and in association with this, the blow mold 40 is closed, the parison 3 being then cut by a sliding cutter 46. When the blow mold 40 is closed, the press pins 42 are left pressing against the parison 8, whereby the built-in part 20 can continue to be held in the predetermined position.

Then, air is blown into the interior of the parison 8 from an air nozzle 45, so that an outer surface of the parison 8 is pressed against the blow mold 40 to mold a fuel tank 1. As this occurs, distal end faces of the press pins 42 and inner surfaces of cavities of the blow mold 40 can lie on the same plane.

Thereafter, the blow mold 40 is opened, so that the fuel tank 1 so molded is removed therefrom.

What is claimed is:

1. An automotive fuel tank formed through blow molding mad having a built-in part mounted in an interior thereof and an outer wall formed from a synthetic resin, wherein a plurality of mounting members are provided on the built-in part which are fusion bonded to the outer wall of the fuel tank so as to mount the built-in part in the interior of the fuel tank, the mounting members each having provided thereon an abutment portion which is brought into abutment with an inner surface of the outer wall of the fuel tank, the abutment portion having formed thereon an abutment surface which extends parallel to and tightly sticks to the inner surface of the outer wall of the fuel tank, a projecting portion which projects substantially perpendicular above the abutment surface in a stepwise fashion and an elongated projection projecting from a surface of the projection portion, whose cross section at a distal end portion is of triangular shape and which penetrates into an interior of the outer wall of the fuel tank, a height of an apex of the elongated projection from the abutment surface being in the range of 30% to 70% of a thickness of the outer wall of the fuel tank.

2. An automotive fuel tank as set forth in claim 1, further comprising more than one of the elongated projection formed on the abutment surface in an arc-like fashion at intervals of 1 mm to 3 mm, and a plurality of air release grooves are formed in a radial direction in such a manner as to traverse the elongated projections.

3. An automotive fuel tank as set forth in claim 1, further comprising more than one of the elongated projection formed on the abutment surface in a radial direction at intervals, the intervals between the elongated projections so formed being in the range of 1 mm to 3 mm.

4. An automotive fuel tank as set forth in claim 1, wherein the mounting member is formed separately from the built-in part and is thereafter brought into engagement with the built-in part.

5. An automotive fuel tank as set forth in claim 1, wherein the outer wall of the fuel tank is formed by five layers including an exterior main layer, an exterior adhesive layer, a barrier layer, an interior adhesive layer and an interior main layer which are arranged in that order from an outside of the outer wall, the exterior main layer and the interior main layer being formed from a high-density polyethylene, the barrier layer being formed from an ethylene-vinyl alcohol copolymer, the exterior adhesive layer and the interior adhesive layer being formed from a synthetic resin having adhesion to both the high-density polyethylene and the barrier layer.

6. An automotive fuel tank as set forth in claim 1, wherein the built-in part has formed thereon a baffle plate or a valve for suppressing flowing noise of a fuel.

7. An automotive fuel tank as set forth in claim 1, further, comprising more than one of the elongated projection formed on the abutment surface in a radial direction at intervals such that air release grooves are formed between the elongated projections.

8. An automotive fuel tank as set forth in claim 1, further comprising than one of the projecting portion and each projecting portion having more then one of the elongated projection wherein
the projecting portions which project from the abutment surface are formed such that the elongated projections are formed therein, and
adjacent ones of the projecting portions are formed apart from each other at a predetermined distance such that a bottom face is formed between the elongated projections.

9. An automotive fuel tank as set forth in claim 8, wherein the predetermined distance between the projecting portions is set to be substantially identical to the height of the elongated projection.

10. An automotive fuel tank formed through Mow molding and having a built-in part mounted in an interior thereof and an outer wall formed from a synthetic resin, comprising a plurality of mounting members provided on the built-in part and fusion bonded to the outer wall of the fuel tank, thereby mounting the built-in part in the interior of the fuel tank; the mounting members each having provided thereon an abutment portion abutting an inner surface of the outer wall of the fuel tank; the abutment portion having formed thereon an abutment surface; the abutment surface extending parallel to and tightly sticking to the inner surface of the outer wall of the fuel tank, a projecting portion projecting substantially perpendicular above the abutment surface and an elongated projection projecting from a surface of the projecting portion; the elongated projection having a cross section at a distal end portion of triangular shape mad penetrating into an interior of the outer wall of the fuel tank; mad a height of ma apex of the elongated projection from the abutment surface being in the range of 30% to 70% of a thickness of the outer wall of the fuel tank.

11. An automotive fuel tank as set forth in claim 10, wherein a plurality of elongated projections matching the elongated projection are formed on the abutment surface in an arc-shaped fashion at intervals of 1 mm to 3 mm, and a plurality of air release grooves are formed in a radial direction and traverse the elongated projections.

12. An automotive fuel tank as set forth in claim 10, wherein a plurality of elongated projections matching the elongated projection are formed on the abutment surface in a radial direction at intervals, the intervals between the elongated projections so formed being in the range of 1 mm to 3 mm.

13. An automotive fuel tank as set forth in claim 10, wherein the mounting member is formed separately from the built-in part and is thereafter brought into engagement with the built-in part.

14. An automotive fuel tank as set forth in claim 10, wherein the outer wall of the fuel tank is formed by five layers including an exterior main layer, an exterior adhesive layer, a barrier layer, an interior adhesive layer and an interior main layer which are arranged in that order from an outside of the outer wall, the exterior main layer and the interior main layer being formed from a high-density polyethylene, the barrier layer being formed from an ethylene-vinyl alcohol copolymer, and the exterior adhesive layer and the interior adhesive layer being formed from a synthetic resin having adhesion to both the high-density polyethylene and the barrier layer.

15. An automotive fuel tank as set forth in claim 10, wherein the built-in part has at least one of a baffle plate and a valve for suppressing flowing noise of a fuel.

16. An automotive fuel tank as set forth in claim 10, wherein a plurality of elongated projections matching the elongated projection are formed on the abutment surface in a radial direction at intervals and air release grooves are formed between the elongated projections.

17. An automotive fuel tank as set forth in claim 10, wherein a plurality of projecting portions project from the abutment surface, a plurality of elongated projections matching the elongated projection are formed in the projecting portions, and adjacent ones of the projecting portions are formed apart from each other at a predetermined distance and a bottom face is formed therebetween.

18. An automotive fuel tank as set forth in claim 17, wherein the predetermined distance between the projecting portions is set to be substantially identical to the height of the elongated projection.

19. An automotive fuel tank as set forth in claim 1, further comprising a plurality of elongated projections matching the elongated projection formed on the abutment surface, and the elongated projections extending parallel to each other and perpendicular to the abutment surface.

20. An automotive fuel tank as set forth in claim 10, further comprising a plurality of elongated projections matching the elongated projection formed on the abutment surface, and the elongated projections extending parallel to each other and perpendicular to the abutment surface.

* * * * *